(12) United States Patent
Wang et al.

(10) Patent No.: US 11,909,218 B1
(45) Date of Patent: Feb. 20, 2024

(54) ENERGY MANAGEMENT OF DISTRIBUTION-LEVEL INTEGRATED ELECTRIC-GAS SYSTEMS WITH FAST FREQUENCY RESERVE

(71) Applicant: NORTH CHINA ELECTRIC POWER UNIVERSITY, Beijing (CN)

(72) Inventors: Cheng Wang, Beijing (CN); Tianshu Bi, Beijing (CN); Guoyi Xu, Beijing (CN); Rui Zhang, Beijing (CN)

( * ) Notice: Subject to any disclaimer, the term of this patent is extended or adjusted under 35 U.S.C. 154(b) by 0 days.

(21) Appl. No.: 18/222,707

(22) Filed: Jul. 17, 2023

(51) Int. Cl.
*H02J 3/46* (2006.01)

(52) U.S. Cl.
CPC ............. *H02J 3/46* (2013.01); *H02J 2203/20* (2020.01)

(58) Field of Classification Search
CPC ................................ H02J 3/46; H02J 2203/20
USPC .......................................................... 700/287
See application file for complete search history.

(56) References Cited

FOREIGN PATENT DOCUMENTS

CN   115313422 A   * 11/2022

OTHER PUBLICATIONS

Q Jia et al. "Robust Operation of Integrated Electric-Gas Systems Considering Frequency Regulation", 2021 IEEE 2nd China International Youth Conference on Electrical Engineering (CIYCEE) (Year: 2021).*
J Ren et al. "Ren Robust Coordinated Dispatch of Integrated Electric-Gas System at the Distribution Level Considering Uncertainty of Wind", 5th IEEE Conference on Energy Internet and Energy System Integration Oct. 22-Oct. 25, 2021. (Year: 2021).*
C Wang et al. "Wang Risk-Loss Coordinated Admissibility Assessment of Wind Generation for Integrated Electric-Gas Systems", IEEE Transactions on Smart Grid, vol. 11, No. 5, Sep. 2020 (Year: 2020).*

* cited by examiner

*Primary Examiner* — Vincent H Tran
*Assistant Examiner* — Michael Tang
(74) *Attorney, Agent, or Firm* — Hunton Andrews Kurth LLP

(57) ABSTRACT

In this disclosure, the energy management problem of the D-IEGS with FFR is analyzed, so as to enhance the frequency stability of the main grid. The post-disturbance frequency response behaviors of both the main grid and the D-IEGS are precisely depicted, where the dead zones, limiting ranges and time constant of the governors are considered. The frequency regulation units of the D-IEGS include GTs and P2G units, whose impacts of providing frequency regulation service on the gas networks are quantified. Considering the time-scale similarity of the frequency dynamics and the dynamics of the GDN, the gas flow dynamics model is adopted. The frequency response dynamics of the GTs and P2G units, and the gas flow dynamics of the GDN, a variable-step difference scheme and a binary variable reduction method are devised.

1 Claim, 13 Drawing Sheets

ENERGY MANAGEMENT OF DISTRIBUTION-LEVEL INTEGRATED ELECTRIC-GAS SYSTEMS WITH FAST FREQUENCY RESERVE

BACKGROUND

In recent years, the share of converter-interfaced power sources, such as wind power and photovoltaic generation, has been increasing around the globe, decreasing the fossil energy consumption and the carbon emission. However, their active power generation capabilities, including the base-case outputs and reserves, are closely related to the weather condition as well as the electrical quantities of the grid connection point, which brings huge challenges on both maintaining and recovering the power system frequency. Meanwhile, the frequency regulation capability provided by thermal and hydro power generators may become insufficient due to their decreasing share among the overall generation assets. Therefore, it is advantageous to explore flexible and reliable frequency regulation resources to enhance the frequency stability of the power grid, where improving the primary frequency regulation (PFR) ability is particularly desired as it is useful to the frequency nadir after a large disturbance.

SUMMARY

This disclosure concerns the energy management of distribution-level integrated electric-gas systems (D-IEGSs), and considers their frequency support capability via providing the fast frequency reserve (FFR) service. The dynamics of the main grid frequency as well as frequency regulation behaviors of gas-fired turbines (GTs) and power-to-gas (P2G) units in the D-IEGS are formulated, including the dead zone, limiting ranges, and the time constant of the governors. The impacts of frequency regulation behaviors of GTs and P2G units on the operation constraints of the D-IEGS are examined through a feasibility check subproblem. Thus, the overall problem becomes a two-stage one, which is solved by the column-and-constraint generation (C&CG) algorithm. The variable-step difference and the binary variable reduction schemes are devised to decrease the computation burden. Simulation results on the LEGS with a 13-bus power network and a 6-node gas network verify the value of FFR provided by the D-IEGS and the necessity of modeling the operation constraints of the gas network.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
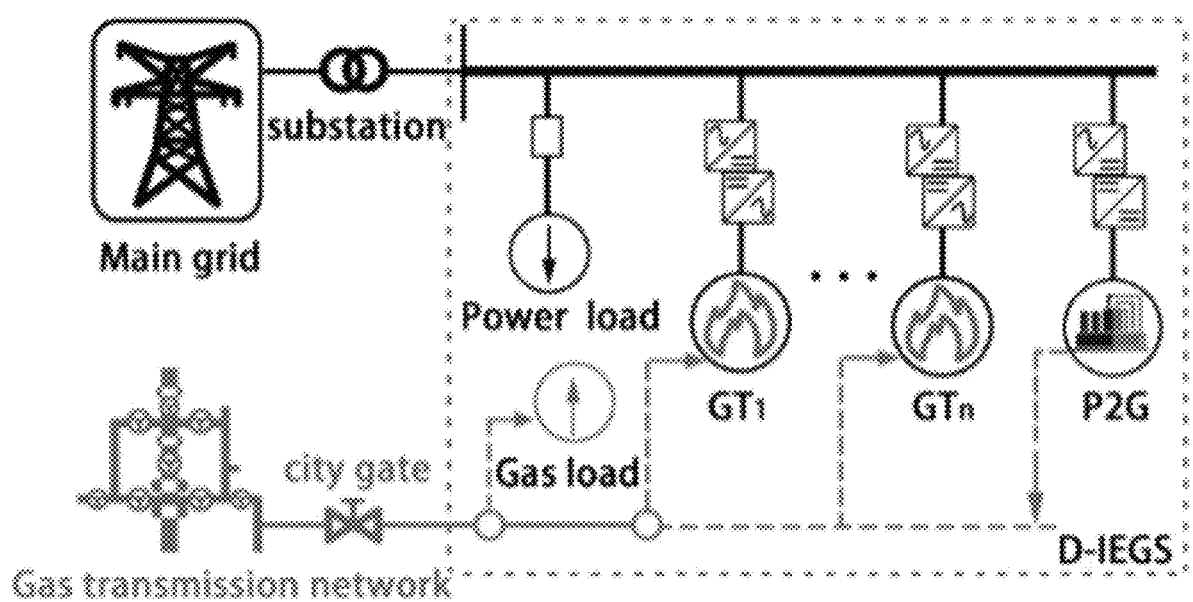
FIG. 1 is an exemplary schematic diagram of a D-IEGS according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

I. Introduction

The distribution-level integrated electric-gas system (D-IEGS) consists of small/micro gas-fired turbines (GTs) and the emerging power-to-gas (P2G) units, which are fast-response and reliable, and has the potential to provide high-quality primary frequency regulation (PFR) services for the main grid. In addition, the gas distribution network (GDN) is coupled with the power distribution network (PDN) via GTs and P2G units, whose relatively slow dynamics could provide extra operation flexibility for the PFR. In fact, many countries have gradually introduced the fast frequency response (FFR) service into the power markets, which offers economic incentives for D-IEGSs to participate in the PFR.

Most works on the operation of integrated electric-gas systems (IEGSs) studied the steady-state operation problems, such as the optimal energy flow, the joint unit commitment (UC), and the operation planning, where the benefits of the joint operation of power systems and gas systems have been revealed, i.e., improving the operation flexibility, decreasing the operation costs and mitigating uncertainties. Though some works analyzed the impacts of power-gas coordination in contingency scenarios, they extended the time interval between the pre- and post-contingency states, and neglected the dynamics during the transient process, which indicates their methods cannot be directly implemented in the frequency regulation problem. However, those works where reserves are committed to deal with the uncertainties or contingencies, are still inspiring for this topic, as the adequate reserve is one of the basic premises if D-IEGSs could provide high-quality PFR services.

During one single frequency regulation process, the active time of PFR is usually less than one minute. Meanwhile, the PFR service and the FFR are paid by the two-part pricing scheme in some electricity markets, which emphasizes the necessity of modeling the frequency dynamics of the main grid as well as the active power contribution of the D-IEGS during the PFR. Nevertheless, the time resolution of existing short-term operation models of the IEGS is usually larger than 5 minutes, which means they are not suitable to describe the PFR behavior of the D-IEGS. Moreover, the active time of the PFR service is comparable with the time constant of distribution-level gas flow dynamics, indicating the inaccuracy of the steady-state gas flow model in this situation. To sum up, modeling of the external dynamics, namely the frequency dynamics of the main grid, and the internal dynamics, which include the dynamic behavior of GTs as well as P2G units and the gas flow dynamics, in an analytical, accurate and computation-friendly manner is the key to formulate the D-IEGS operation problem considering the PFR service.

To model the frequency dynamics of the main grid, the mainstream method is the system frequency response (SFR) model and its improved variants. The general modeling steps can be summarized as: (i) firstly, build up aggregated models of the rotors and governors in the complex frequency domain; (ii) then, convert the model to a time-domain one using the Laplace transform; (iii) next, derive time-domain analytical formulas of the frequency stability indices, such as the frequency nadir; (iv) finally, apply linearization techniques to obtain tractable formulas of the feature points of the frequency curve. To obtain the tractable frequency nadir formula w.r.t. the frequency regulation parameters, assumptions and simplifications have to be made, i.e., neglecting the limiters and the dead zones of the governors, enforcing the linear-response condition on all the governors, and setting uniform reheating time constant for all the governors, which would decrease the frequency dynamics modeling accuracy of the main grid. Besides the SFR based models, another thread to depict the main grid frequency dynamics is the difference-and-discretization (D&D) method, where the grid frequency dynamics is treated as a set of differential-algebra equations with limiters and dead zones. The differential terms are approximated by the finite different treatment, and the nonlinear terms are linearized by adding auxiliary binary variables. In general, its accuracy is much higher than the SFR based models, however, its computation burden is also far larger. Therefore, it is desirable to combine the merits of those two modeling methods.

The internal dynamics of the D-IEGS consists of the frequency response dynamics of the electrical units and the gas flow dynamics of the GDN. The former can be formulated by the D&D method, where the incremental active power of the D-IEGS during the PFR can be accurately quantified. The latter, however, is much more challenging, as it is described by a set of partial differential equations (PDEs). The straightforward idea is to apply the finite difference method, yet it would bring up the trouble of balancing the modeling accuracy and computation burden. Fortunately, various lightweight models of the gas flow dynamics have been derived, including the frequency-domain models, the complex frequency domain models, and the time-domain one, which could be adopted in the case of D-IEGS providing PFR.

To this end, it is not difficult to verify that the strategies and effects of the D-IEGS participating in PFR remain open questions. In this disclosure, the energy management problem of D-IEGSs considering supporting the PFR is described, where the frequency regulation ability of the D-IEGS is enabled by committing FFR. The profits of providing FFR is calculated according to the two-part pricing scheme, and the impacts of D-IEGS providing PFR on the main grid frequency and the operation of the D-IEGS are accurately characterized. Compared with the existing works, the contributions are threefold:

(1) This is the first disclosure to formulate the energy management model of D-IEGSs with FFR. The frequency dynamics of the main grid as well as the frequency response of the D-IEGS are accurately described, where the differences of both the steady-state parameters, namely, limiting ranges and dead zones, and the dynamic parameter, such as the time constants, of the frequency regulation units can be reflected.

(2) The detailed behaviors of the GTs and the P2G units during the PFR are depicted according to the FFR requirement, which are adopted to portray the impacts of their variable working conditions on the D-IEGS. To guarantee the operational feasibility of the D-IEGS, the worst-case based feasibility check sub-problem is proposed, making the overall model a two-stage robust one.

(3) Two methods are devised to decrease the computation burden of the described model, which are: i) using variable-step difference scheme to formulate the dynamics of the aggregated generator in the main grid and the frequency regulation units in the D-IEGS; ii) reducing 50% of auxiliary binary variables for linearizing the limiter and the dead zone parts by exploiting the components of the objective function.

II. Modeling the Dynamics of the Coupled Energy Systems

FIG. 1 is an exemplary schematic diagram of a D-IEGS according to an exemplary embodiment. The schematic diagram of the D-IEGS is shown in FIG. 1. It consists of a PDN and a GDN, where the heterogeneous energy networks are coupled through GTs and P2G units. Meanwhile, it interacts with the upper-level power and gas systems via the substation and the city gate, respectively.

Figure 2:
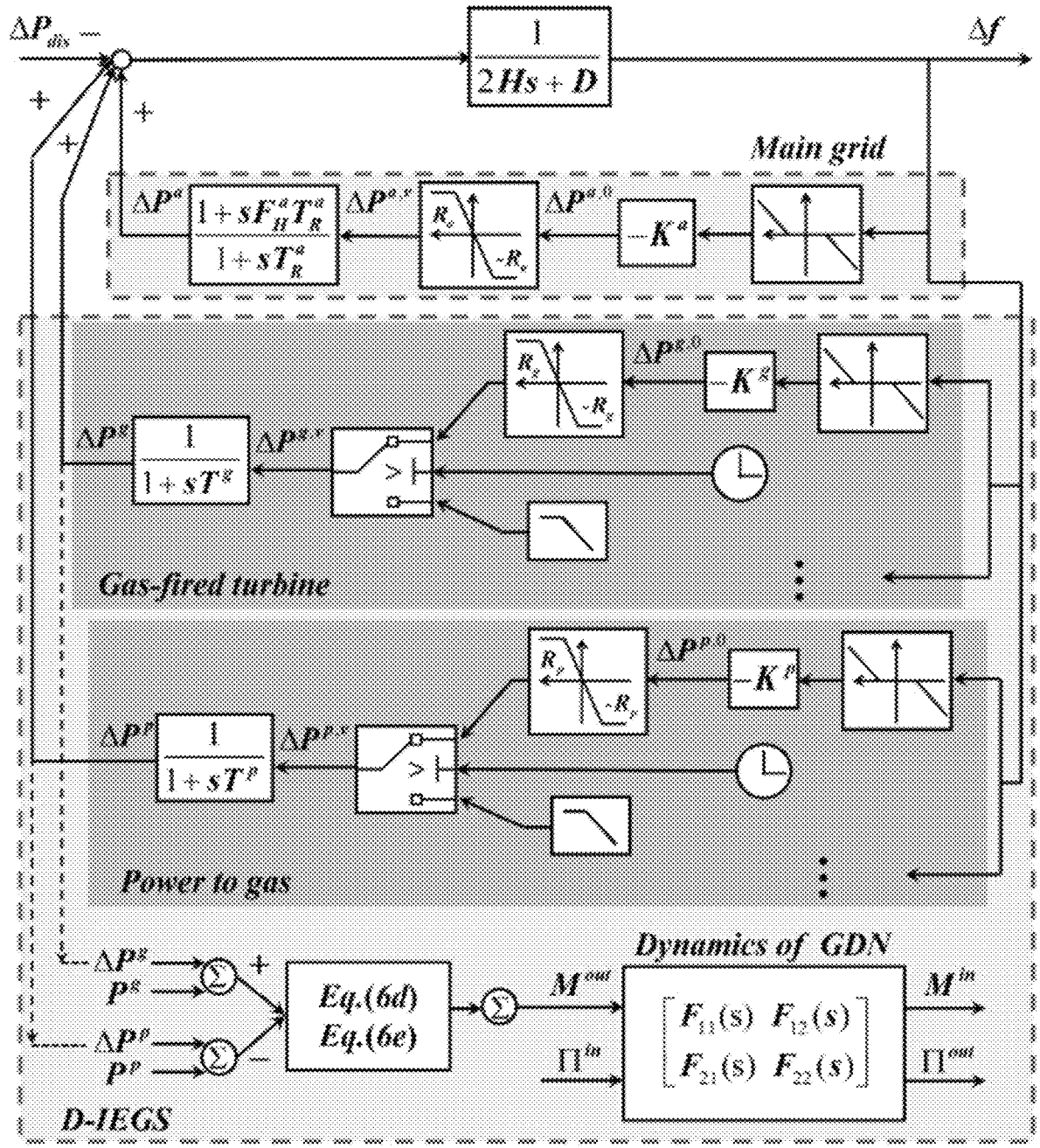
FIG. 2 shows an exemplary s-domain dynamics model of the coupled energy systems according to an exemplary embodiment.

To describe the frequency of the main grid, the dynamics of both the frequency regulation units in the main grid and the GTs as well as P2G units in the D-IEGS should be considered. Meanwhile, via the GTs and the P2G units, the active-power-frequency dynamics of the PDN would impact the pressure-flow dynamics of the GDN. The frequency dynamics in the main grid is developed based on the improved SFR (I-SFR) model, where the limiters and dead bands of the governors are included. In detail, the frequency regulation units in the main grids are aggregated as one unit, and the FFR provided by the GTs and P2G units is utilized by the droop control scheme. The pressure-flow dynamics in the GDN are subject to a set of PDEs, including the continuity and momentum equations, which can be represented in two-port form. Then, the schematic diagram of dynamics model of the coupled energy systems in s-domain can be drawn as FIG. 2. FIG. 2 shows an exemplary s-domain dynamics model of the coupled energy systems according to an exemplary embodiment.

A. Frequency Dynamics of the Main Grid

The frequency dynamics in the I-SFR model can be formulated by the swing function, and can be further discretized by the finite difference method, as demonstrated by (1a), where the FFR provided by the D-IEGS is considered and the difference time step is set as $\Delta \tau_e$; the incremental active power of the aggregated governor can be calculated by a three-step serial model, namely, the droop gain and dead band formula (1b), the limiter formula (1c), and the discretized dynamic response formula (1d). It should be highlighted that (1b)-(1d) are valid for low-frequency disturbances, say $\Delta P_{dis,t_e}^- > 0$. For modeling simplicity, the downward reserve is assumed to be identical to the upward reserve. In addition, the incremental active power formulas for high-frequency disturbances are quite similar to (1b)-(1d).

$$\Delta f_{t_e,\tau_e} = \Delta f_{t_e,\tau_e-1} + \frac{\Delta \tau_e}{2H} \frac{f_0}{S_b} \left( -\Delta P_{dis,t_e}^- + \right. \tag{1a}$$

$$\left. \Delta P_{t_e,\tau_e-1}^a + \sum_{g \in \mathcal{G}_g} \Delta P_{t_e,\tau_e-1}^g + \sum_{p \in \mathcal{G}_p} \Delta P_{t_e,\tau_e-1}^p - D \frac{\Delta f_{t_e,\tau_e-1}}{f_0} P_{L,t_e} \right)$$

$$\Delta P_{t_e,\tau_e}^{a,0} = \max\left(-K^a(\Delta f_{t_e,\tau_e} + \Delta f_{db})\frac{\overline{P}^a}{f_0}, 0\right) \forall \tau_e, t_e \tag{1b}$$

$$\Delta P_{t_e,\tau_e}^{a,v} = \min(\Delta P_{t_e,\tau_e}^{a,0}, R_{a t_e}), \forall \tau_e, t_e \tag{1c}$$

$$\Delta P_{t_e,\tau_e}^a = \Delta P_{t_e,\tau_e-1}^a + \tag{1d}$$

$$\frac{\Delta \tau_e}{T_R^a}(\Delta P_{t_e,\tau_e-1}^{a,v} - \Delta P_{t_e,\tau_e-1}^a) + F_H^a(\Delta P_{t_e,\tau_e}^{a,v} - \Delta P_{t_e,\tau_e-1}^{a,v}), \forall \tau_e, t_e$$

B. Active Power Dynamics of the FFR Units

Figure 3:
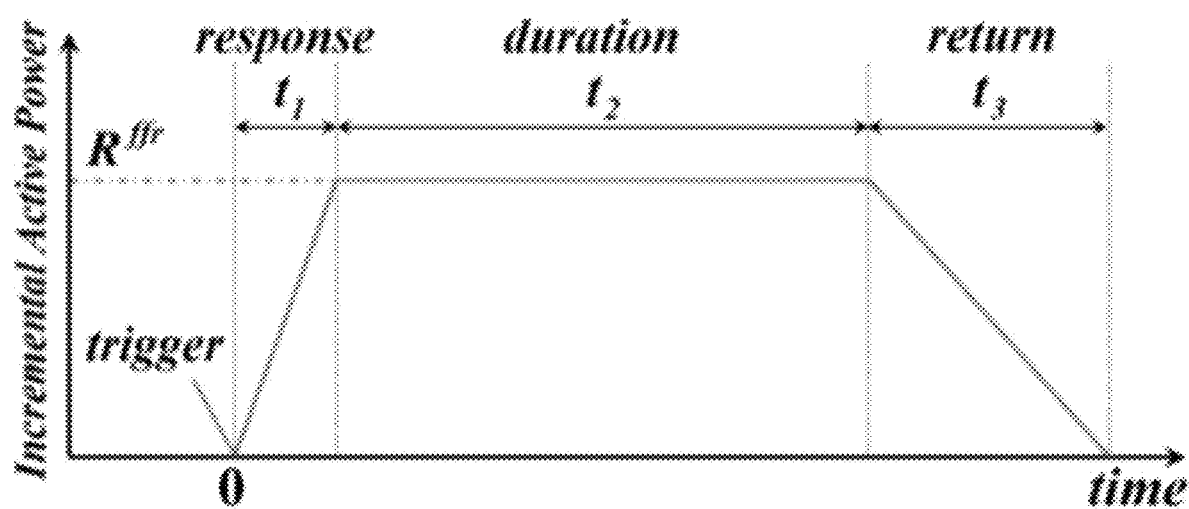
FIG. 3 shows a schematic of an exemplary FFR service according to an example embodiment.

FIG. 3 shows a schematic of an exemplary FFR service according to an example embodiment. The FFR service can be divided into three stages, as shown in FIG. 3, including the response stage, the duration stage, and the return stage, whose duration time are $t_1$, $t_2$ and $t_3$, respectively. The active power dynamics of the GTs and the P2G units are described by (2a)-(2c) and (2d)-(2f), respectively. Similar to the aggregated unit of the main grid, their incremental active power are also formulated by three-step serial models, which include the dead band and the droop gain formulas, namely (2a) and (2d), the FFR command formulas, say (2b) and (2e), and the discretized active power dynamics formulas, i.e. (2c) and (2f). The droop gain and dead band can be tuned based on the FFR requirement, the upper and lower boundaries of the limiter formulas correspond to the committed FFR, namely $R_{gt_e}$ and $R_{pt_e}$, and the active power dynamics of the FFR units are approximated as first-order inertia systems. The dynamics under high-frequency disturbances are also omitted for simplicity.

Notably, the FFR command formulas (2b) and (2e) are consistent with the FFR service duration process shown in FIG. 3. If the FFR service is in the response stage, the FFR commands for GTs and P2G units would be $\Delta P_{t_e,\tau_e}^{g,0}$ and $\Delta P_{t_e,\tau_e}^{p,0}$; and if the FFR service enters the duration stage, the FFR commands would be $\min(\Delta P_{t_e,\tau_e}^{g,0}, R_{gt_e})$ and $\min(\Delta P_{t_e,\tau_e}^{g,0}, R_{pt_e})$; and if the FFR service falls into the return stage, the commands would subject to the third terms in (2b) and (2e), respectively.

$$\Delta P_{t_e,\tau_e}^{g,0} = \max\left(-K^g(\Delta f_{t_e,\tau_e} + \Delta f_{db})\frac{\overline{P}^g}{f_0}, 0\right), \forall \tau_e, t_e \tag{2a}$$

$$\Delta P_{t_e,\tau_e}^{g,v} = \min\left\{\Delta P_{t_e,\tau_e}^{g,0}, R_{gt_e}, \frac{\Delta P_{t_e,\Gamma_1}^{g,v}(\tau_e - \Gamma_3)}{(\Gamma_2 - \Gamma_3)}\right\} \tag{2b}$$

$$\Gamma_i = \frac{t_i}{\tau_e}, i = 1, 2, 3$$

$$P_{t_e,\tau_e}^g = \Delta P_{t_e,\tau_e-1}^g + \frac{\Delta \tau_e}{T^g}(\Delta P_{t_e,\tau_e-1}^{g,v} - \Delta P_{t_e,\tau_e-1}^g) \tag{2c}$$

$$\Delta P_{t_e,\tau_e}^{p,0} = \max\left(-K^p(\Delta f_{t_e,\tau_e} + \Delta f_{db})\frac{\overline{P}^p}{f_0}, 0\right), \forall \tau_e, t_e \tag{2d}$$

$$\Delta P_{t_e,\tau_e}^{p,v} = \min\left\{\Delta P_{t_e,\tau_e}^{p,0}, R_{pt_e}, \frac{\Delta P_{t_e,\Gamma_1}^{p,v}(\tau_e - \Gamma_3)}{(\Gamma_2 - \Gamma_3)}\right\} \tag{2e}$$

$$\Gamma_i = \frac{t_i}{\tau_e}, i = 1, 2, 3$$

$$P_{t_e,\tau_e}^p = \Delta P_{t_e,\tau_e-1}^p + \frac{\Delta \tau_e}{T^p}(\Delta P_{t_e,\tau_e-1}^{p,v} - \Delta P_{t_e,\tau_e-1}^p) \tag{2f}$$

C. Pressure-Flow Dynamics of the GDN

The pressure-flow dynamics in the GDN can be described by continuity formula (3a) and momentum formula (3b), which can be converted into a second-order hyperbolic equation by taking partial derivatives. Then, a time-domain two-port model of the gas flow dynamics can be derived after performing the three-layer explicit difference approximation, as demonstrated by (4). In (4), the relationship among the pressure and the gas flow of the inlet and outlet nodes is described by a set of linear equations, where $A_{lg}$, $B_{lg}$, $C_{lg}$, $D_{lg}$, $E_{lg}$, $F_{lg}$, $G_{lg}$, $H_{lg}$ are constant coefficient matrices. Particularly, $M_{l_g}^0$ and $\Pi_{l_g}^0$ are the boundary conditions of gas flow, which could be obtained by steady-state analysis of the GDN.

$$\frac{\partial \rho}{\partial t} + \frac{\partial(\rho w)}{\partial x} = 0 \tag{3a}$$

$$\frac{\partial(c^2 \rho)}{\partial x} + \frac{\partial(\rho w)}{\partial t} + \frac{\lambda \rho \overline{w} w}{2D} = 0 \tag{3b}$$

$$\begin{bmatrix} M_{lg}^{in} \\ \Pi_{lg}^{out} \end{bmatrix} = \begin{bmatrix} A_{lg} & B_{lg} \\ C_{lg} & D_{lg} \end{bmatrix} \begin{bmatrix} M_{lg}^{out} \\ \Pi_{lg}^{in} \end{bmatrix} + \dots + \begin{bmatrix} E_{lg} & F_{lg} \\ G_{lg} & H_{lg} \end{bmatrix} \begin{bmatrix} M_{lg}^0 \\ \Pi_{lg}^0 \end{bmatrix}, \tag{4}$$

$$M_{lg}^{\{\cdot\}} := \left[M_{lg,1}^{\{\cdot\}}; M_{lg,2}^{\{\cdot\}}; \dots ; M_{lg,\tau_g}^{\{\cdot\}}; \dots ; M_{lg,|\Gamma_g|}^{\{\cdot\}}\right],$$

$$\Pi_{lg}^{\{\cdot\}} := \left[\Pi_{lg,1}^{\{\cdot\}g}; \Pi_{lg,2}^{\{\cdot\}'}; \dots ; \Pi_{lg,\tau_g}^{\{\cdot\}g}; \dots ; \Pi_{lg,|\Gamma_g|}^{\{\cdot\}g}\right],$$

$$\{\cdot\}^g = \{in, out\}, \forall l_g.$$

III. Energy Management of the D-IEGS with FFR

A. Modeling the Steady-State Operation Constraints

1) Steady-State Operation Constraints of the PDN: the nodal active and reactive power balancing equations are described by (5a)-(5b), where $\Psi(n_e)$ with different subscripts express the element sets connected to node $n_e$; the voltage drop equation along each line is demonstrated by (5c); (5d) represents the relaxed apparent power; (5e)-(5f) constrain the nodal voltage and line current square, respectively; (5g) gives the capacity of the substation, which restricts the exchanged power between the D-IEGS and the main grid; (5h)-(5i) show the generation and FFR constraints of the GTs; (5j)-(5k) enforce the consumption and FFR constraints of the P2G units. For modeling simplicity, the positive and negative FFR provided by the GTs and P2G units are assumed to be the same.

$$\sum_{g \in \Psi_g(n_e)} P_{gt_e} + \sum_{l_e \in \Psi_{l_e}(n_e)} (P_{l_e t_e} - r_{l_e} I_{l_e t_e}) + 1_{\{n_e = n_e^0\}} P_{bt_e} = \tag{5a}$$

-continued $$\sum_{p \in \Psi_p(n_e)} P_{pt_e} + \sum_{l_e \in \Psi_{l_e}^+(n_e)} P_{l_e t_e} + \sum_{d_e \in \Psi_{d_e}(n_e)} P_{d_e t_e}, \forall n_e, t_e$$

$$\sum_{g \in \Psi_g(n_e)} Q_{gt_e} + \sum_{l_e \in \Psi_{l_e}^-(n_e)} (Q_{l_e t_e} - x_{l_e} I_{l_e t_e}) + 1_{\{n_e = n_e^0\}} Q_{bt_e} = \quad (5b)$$

$$\sum_{p \in \Psi_p(n_e)} Q_{pt_e} \sum_{l_e \in \Psi_{l_e}^+(n_e)} Q_{l_e t_e} + \sum_{d_e \in \Psi_{d_e}(n_e)} Q_{d_e t_e}, \forall n_e, t_e$$

$$v_{n_e^- t_e} = v_{n_e^+ t_e} - 2(r_{l_e} P_{l_e t_e} + x_{l_e} Q_{l_e t_e}) + (r_{l_e}^2 + x_{l_e}^2) I_{l_e t_e}, \forall l_e, t_e \quad (5c)$$

$$\|2P_{l_e t_e}, 2Q_{l_e t_e}, I_{l_e t_e} - v_{n_e^+ t_e}\|_2 \leq I_{l_e t_e} + v_{n_e^- t_e}, \forall l_e, t_e \quad (5d)$$

$$(\underline{v}_{n_e})^2 \leq v_{n_e t_e} \leq (\overline{v}_{n_e})^2, \forall n_e, t_e \quad (5e)$$

$$0 \leq I_{l_e t_e} \leq (\overline{I}_{l_e})^2, \forall l_e, t_e \quad (5f)$$

$$\|P_{bt_e}, Q_{bt_e}\|_2 \leq CAP^b, \forall t_e \quad (5g)$$

$$\underline{P}^g + R_{gt_e} \leq P_{gt_e} \leq \overline{P}^g - R_{gt_e}, R_{gt_e} \geq 0, \forall t_e \quad (5h)$$

$$\underline{Q}^g \leq Q_{gt_e} \leq \overline{Q}^g, \forall t_e \quad (5i)$$

$$\underline{P}^p - R_{pt_e} \leq P_{pt_e} \leq \overline{P}^p + R_{pt_e}, R_{pt\ e} \geq 0, \forall t_e \quad (5j)$$

$$\underline{Q}^p \leq Q_{pt_e} \leq \overline{Q}^p, \forall t_e \quad (5k)$$

2) Steady-State Operation Constraints of the GDN: the nodal gas balancing condition is given by (6a), where $\Psi(n_g)$ with different subscripts express the element sets connected to node $n_g$; (6b) represents the gas exchange capacity and the pressure setting value of the city gate; (6c) restricts the nodal gas pressure; the consumed gas of the GTs and the generated gas of the P2G units are described by (6d). Considering the gas consumption/production of the FFR units, $M_{g\tau_g}$ and $M_{p\tau_g}$ in (6a) should be replaced with $(M_{g\tau_g} + \Delta M_{g\tau_g})$ and $(M_{p\tau_g} + \Delta M_{p\tau_g})$, respectively, where the expressions of $\Delta M_{g\tau_g}$ and $\Delta M_{p\tau_g}$ are given by (6e).

$$\sum_{w \in \Psi_w(n_g)} M_{w\tau_g} + \sum_{l_g \in \Psi^{in}(n_g)} M_{l_g \tau_g}^{in} + \sum_{p \in \Psi_p(n_g)} M_{p\tau_g} = \quad (6a)$$

$$\sum_{g \in \Psi_g(n_g)} M_{g\tau_g} + \sum_{l_g \in \Psi^{out}(n_g)} M_{l_g \tau_g}^{out} + \sum_{d_g \in \Psi_{d_g}(n_g)} M_{d\tau_g}, \forall \tau_g$$

$$0 \leq M_{w\tau_g} \leq \overline{M}_w, \prod_{w\tau_g} = const, w \in \Psi_w(n_g), \forall \tau_g \quad (6b)$$

$$\underline{\Pi}_{n_g} \leq \Pi_{n_g \tau_g} \leq \overline{\Pi}_{n_g}, \forall \tau_g, n_g \quad (6c)$$

$$M_{g\tau_g} = \frac{P_{gt_e}}{\eta_g}, \forall t_e, \tau_g, M_{p\tau_g} = \eta_p P_{pt_e}, \forall t_e, \tau_g \quad (6d)$$

$$\Delta M_{g\tau_g} = \frac{\Delta P_{t_e,\tau_e}^g}{\eta_g}, \Delta M_{p\tau_g} = \eta_p \Delta P_{t_e,\tau_e}^p, \forall t_e, \tau_g \quad (6e)$$

B. The Overall Model

The energy management objective function of the D-IEGS consist of four parts, namely, the electricity and gas purchase costs under the steady-state operation condition, the gas reserve costs, the reserve capacity revenue of the FFR units, and the frequency regulation revenue of the FFR units under the worst-case frequency disturbance, as shown in (7). The constraints include the steady-state operation constraints of the D-IEGS, which are (5) and (6), and the dynamics of the D-IEGS during frequency regulation, say (1)-(2) and (4).

$$Obj = \min\left\{\sum_{t_e=1}^{T_e} c_{et} P_{bt_e} + \sum_{\tau_g=1}^{T_g} c_{gt} M_{w\tau_g}\right\} + \quad (7)$$

$$\left\{c_{gt}^r \sum_{\tau_g=1}^{T_g} \left(\sum_{g \in \mathcal{G}_g} \Delta M_{g\tau_g} + \sum_{p \in \mathcal{G}_P} \Delta M_{p\tau_g}\right)\right\} -$$

$$\left\{c_{et}^{rc} \sum_{t_e=1}^{T_e} \left(\sum_{g \in \mathcal{G}_g} R_{gt_e} + \sum_{p \in \mathcal{G}_P} R_{pt_e}\right)\right\} - \left\{c_{et}^{rr} \sum_{t_e=1}^{T_e} \sum_{\tau_e=1}^{\Gamma_1} \Delta f_{t_e,\tau_e} - \sum_{\tau_e=1}^{\Gamma_1} \Delta f_{t_e,\tau_e}^0\right\}$$

It should be noted that almost all the constraints are linear except the second-order cone constraints (5d) and (5g) as well as the constraints (1b)-(1c), (2a)-(2b) and (2d)-(2e) involving the min(•) and max(•) operators. In addition, the concurrence of the min(•) and max (•) operators would make the overall problem not only non-convex but also unsolvable by the commercial solvers.

C. Model Linearization and Simplification

1) Dealing with the min/max Operators: Formulas (1b), (2a) and (2d) with max (•) operators can be expressed in a general form as y=max(x, 0), which can be equivalently converted to a set of mixed integer linear constraints using the big-M method:

$$y = \max(x, 0) \Leftrightarrow \begin{cases} y \geq x, y \geq 0 \\ y \leq x + M(1 - r_1) \\ y \leq M(1 - r_2) \\ r_1 + r_2 \geq 1, r_1, r_2 \in \{0, 1\}. \end{cases} \quad (8)$$

As for (1c), (2b) and (2e), their general form can be expressed as y=min(x, a, b), which can be equivalently represented by the following maximization problem:

$$y = \min(x, a, b) \Leftrightarrow \begin{cases} \max y \\ y \leq x, y \leq a, y \leq b \end{cases}. \quad (9)$$

Noted that the incremental active power of frequency regulation units $\Delta P_{t_e,\tau_e}^{\alpha,v}$, $\Delta P_{t_e,\tau_e}^{g,v}$ and $\Delta P_{t_e,\tau_e}^{p,v}$ are positive correlated with the frequency deviation $\Delta f_{\tau_e,t_e}$, and the weighted sum of $\Delta f_{\tau_e,t_e}$ has been equivalently maximized in the objective function (7), $$\text{say min} - \sum_{t_e=1}^{T_e} \sum_{\tau_e=1}^{T_e} \Delta f_{\tau_e,t_e},$$

therefore, (1c), (2b) and (2e) can be equivalently replaced by a set of linear constraints:

$$\Delta P_{\tau_e,t_e}^{a,v} \leq \Delta P_{\tau_e,t_e}^{a,0}, \Delta P_{\tau_e,t_e}^{a,v} \leq R_{at_e}, \forall t_e, \tau_e \quad (10)$$

$$\Delta P_{\tau_e,t_e}^{g,v} \leq \Delta P_{\tau_e,t_e}^{g,0}, \Delta P_{\tau_e,t_e}^{g,v} \leq R_{gt_e}, \Delta P_{\tau_e,t_e}^{g,v} \leq \Delta P_{t_e,\Gamma_1}^{g,v} \frac{\tau_e - \Gamma_3}{\Gamma_2 - \Gamma_3}$$

$$\Delta P_{\tau_e,t_e}^{p,v} \leq \Delta P_{\tau_e,t_e}^{p,0}, \Delta P_{\tau_e,t_e}^{p,v} \leq R_{pt_e}, \Delta P_{\tau_e,t_e}^{p,v} \leq \Delta P_{t_e,\Gamma_1}^{p,v} \frac{\tau_e - \Gamma_3}{\Gamma_2 - \Gamma_3}$$

2) The Variable-Step Difference Scheme: In the described model, (1a), (1d), (2c) and (2f) imply finite difference calculation, where the modeling accuracy and computation burden should be balanced through choosing proper difference steps. The response the reheat thermal power units is relatively slow, whose time constants are around 6 to 14 seconds. Therefore, active power dynamics of their governors, say (1d), can be discretized is a larger time step, denoted as $\tau_e^s$. As for the FFR units, the time constants of active power response are typically around 0.04 to 0.1 seconds, indicating a smaller time step, denoted as $\tau_e^f$, should be selected for (2c) and (2f). The grid frequency dynamics (1a) acts as the bridge between the states of the aggregated generator in the main grid and the FFR units, thus, its time step should be consistent with the fast-dynamics ones, namely (2c) and (2f).

Figure 4:
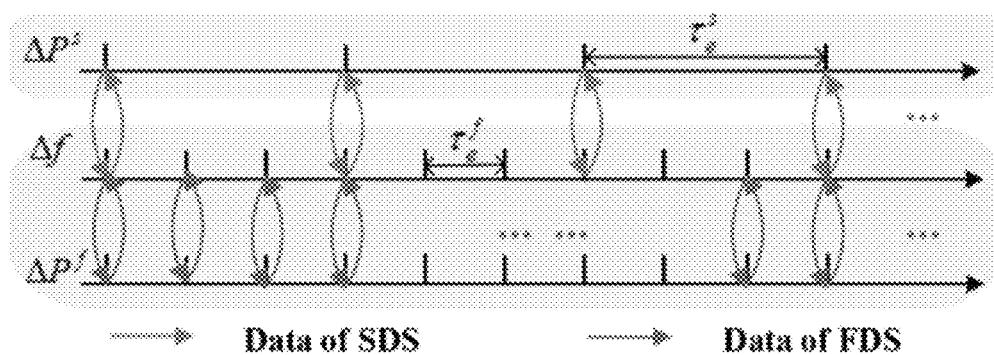
FIG. 4 depicts exemplary the information interaction mechanism between the FDS and the SDS according to an exemplary embodiment.

For the ease of analysis, the dynamics equations with small and large time steps are denoted as the fast dynamic system (FDS) and the slow dynamic system (SDS), respectively. FIG. 4 depicts exemplary the information interaction mechanism between the FDS and the SDS according to an exemplary embodiment. The FDS exchanges data among (1a), (2c) and (2f) with the period of $\tau_e^f$, and continuously updates the grid frequency deviation and the incremental active power of FFR units. During this period, the output of the aggregated generator in the main grid remains unchanged. The FDS and the SDS exchange data with the period of ie and update the output of the aggregated generator.

IV. Model Reformulation and Solution Methodology

A. Uncertainty Propagation Mechanism in D-IEGS

In the main grid, the active power disturbance uncertainty could be modeled as $$\Delta P_{dis,t_e} = z_{t_e}^u \Delta P_{dis,t_e}^- - z_{t_e}^d \Delta P_{dis,t_e}^+, \forall t_e$$

$$\{z_{t_e}^u, z_{t_e}^d \in \{0,1\}, z_{t_e}^u + z_{t_e}^d \leq 1\}, \quad (11)$$

which indicates the unbalance active power could be positive or negative. The disturbance power would lead to the frequency deviation and the FFR in the D-IEGS would be activated, where the incremental active power of FFR units is subject to (1) and (2). Then, the gas consumption/production amount would be changed, according to (6e). Therefore, the active power disturbance uncertainty in the main grid would be propagated to the PDN of the D-IEGS through the FFR mechanism, and to the GDN of the D-IEGS via the FFR units, namely the GTs and the P2G units.

Figure 5:
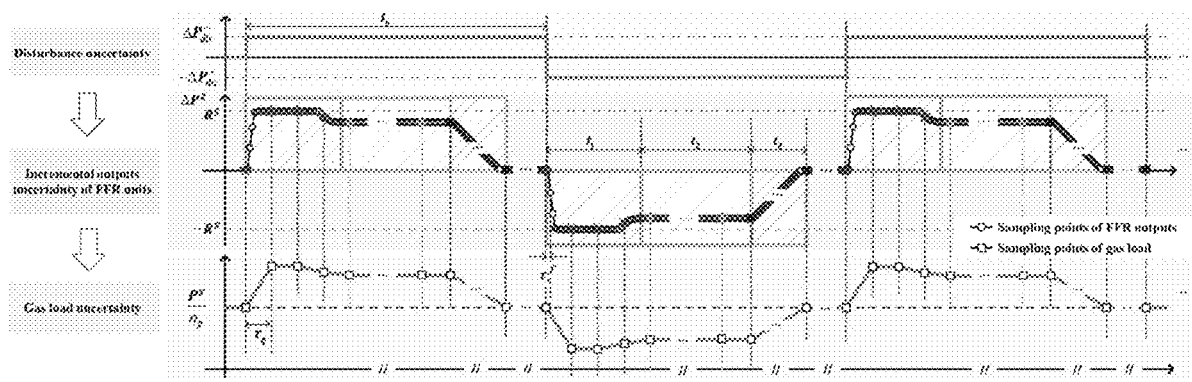
FIG. 5 shows exemplary uncertainty propagation mechanism in D-IEGS according to an exemplary embodiment.

To describe the gas flow dynamics, the time resolution of the gas flow model $\tau_g$ should be smaller than the steady-state PDN model $t_e$. Meanwhile, the time step of the FFR unit dynamics, namely $\tau_e^f$, is smaller than $\tau_g$. Suppose we have $t_e = N_g \tau_g$ and $\tau_g = N_e \tau_e^f$. The uncertain FFR incremental outputs can be described by $$\tilde{P}_{gt_e,k} = P_{gt_e} + (z_{gt_e}^u - z_{gt_e}^d) \Delta P_{t_e,k}^g, \quad 1 \leq k \leq N$$

$$\{z_{gt_e}^u, z_{gt_e}^d \in \{0,1\}, z_{gt_e}^u + z_{gt_e}^d \leq 1\} \quad (12)$$

$$\tilde{P}_{pt_e,k} = P_{pt_e} - (z_{pt_e}^u - z_{pt_e}^d) \Delta P_{t_e,k}^p, \quad 1 \leq k \leq N$$

$$\{z_{pt_e}^u, z_{pt_e}^d \in \{0,1\}, z_{pt_e}^u + z_{pt_e}^d \leq 1\} \quad (13)$$

where $\Delta P_{t_e,k}^g$ and $\Delta P_{t_e,k}^p$ denote the incremental active power outputs/consumption of the GTs and P2G units during the FFR regulation process, respectively. The FFR outputs are determined by the FFR service requirement, which includes three stages as shown in FIG. 3. The consumed/generated gas uncertainty by FFR units in the aforementioned three stages can be obtained by sampling points from the curve of the FFR unit incremental outputs, as shown in FIG. 5. FIG. 5 shows exemplary uncertainty propagation mechanism in D-IEGS according to an exemplary embodiment. Thus, the gas load uncertainty can be quantified by:

$$\tilde{M}_{gt_g} = \begin{cases} \tilde{P}_{gt_e,k}/\eta_g, \tau \in [1, N] \\ P_{gt_e}/\eta_g, \tau \in (N, N_g] \end{cases}, \tilde{M}_{pt_g} = \begin{cases} \tilde{P}_{pt_e,k}\eta_p, \tau \in [1, N] \\ P_{pt_e}\eta_p, \tau \in (N, N_g] \end{cases} \quad (14)$$

where $\tilde{M}_{gt_g}$ and $\tilde{M}_{pt_g}$ represent the gas consumption uncertainty of the GTs and the gas generation uncertainty of the P2G units, respectively.

B. Energy Management Strategy Robustification

In order to maintain the FFR service quality and the operation feasibility of the D-IEGS, the committed FFR should not jeopardize the operation constraints of the D-IEGS in any frequency regulation condition, which suggests the robustness of the D-IEGS energy management strategy against the frequency disturbance uncertainty should be guaranteed. From (12)-(14), the overall uncertainty set a traditional box-like one. Meanwhile, the steady-state operation constraints of the D-IEGS are convex, which are linear and second-order cone (SOC) ones. Therefore, the robust energy management strategy can be obtained by firstly reformulating the overall model as a two-stage robust one and then applying the column-and-constraint (C&CG) solution algorithm. In what follows, the major steps of the model reformulation and the C&CG algorithm would be presented.

1) Initializing the main problem: the overall problem for the D-IEGS operation with FFR serves as the initial main problem, whose objective function and constraints are (7) and the simplified (1), (2), (4) as well as (5)-(6), respectively. The compact form the initial main problem is:

$$\min_x c^T x + b^T \tilde{y} \quad (15)$$

$$\text{s.t. } Ax + B\tilde{y} \leq d$$

$$\|F_i x + g_i\|_2 \leq K_i^T x + f_i, i \in \mathcal{L}$$

where $\tilde{y}$ denotes the FFR reserve vector; x is a vector of all the remaining decision variables; A, B, $F_i$, $K_i$, d, $g_i$, $f_i$, c and b are constant coefficient matrices or vectors; i and $\mathcal{L}$ are the index and the set of SOC constraints.

2) Solving the feasibility-check sub-problem: the feasibility-check sub-problem is to test the operation constraint violation against the worst-case uncertainty, whose compact form is as follows.

$$\max_z \min_{s \geq 0, x} 1^T s \quad (16)$$

$$\text{s.t. } Ex + Gs + Hz \leq h - C\tilde{y}^*$$

$$\|F_i x + g_i\|_2 \leq K_i^T x + f_i, i \in \mathcal{L}$$

where z denotes the boolean uncertainty variables; s denotes relax variables; $\tilde{y}^*$ is the solution of the master problem. Although (16) admits a bi-level program, it can be equivalently converted into single-level mixed integer SOC problem and solved by commercial solvers.

3) Adding constraints to the main problem: If the objective value of (16) is positive, it indicates the energy management strategy of the D-IEGS is not robust to all the possible frequency disturbances. Then, the following constraints would be added to the main problem, and the updated main problem and the feasibility-check sub-problem would be solved again.

$$Ex^j + C\tilde{y} + Hz^{j*} \leq h \quad (17)$$

$$\|F_i x^j + g_i\|_2 \leq K_i^T x^j + f_i, i \in \mathcal{L}$$

where j is the iteration index; $z^{j*}$ represents the identified worst-case uncertainty in $j^{th}$ iteration; $x^j$ is the new variable vector added to the main problem.

This disclosure refers to a D-IEGS energy management model considering dynamic frequency constraints, which aims to maximize the FFR capability of D-IEGS, so as to benefit as much as possible from the FFR mechanism, and improve the post-disturbance frequency nadir to maintain the frequency stability of the system. The main problem uses the forecast information of the electric and gas loads to obtain the operating strategy of the units, including the operation point and reserve capacity, with the objective function of maximizing the economic benefits and FFR offering capability. The reserve capacity determines the FFR capacity of the D-IEGS, which in turn affects the post-disturbance frequency nadir. The operating point and frequency regulation behavior of the GTs and P2G units affects the safe operation of D-IEGS, which needs to be achieved in conjunction with the feasibility-check sub-problem.

In the D-IEGS, when the power generation of GTs and P2G units changes, node gas injection will change, such kind of operational uncertainty would be broadcast to the whole network via gas pipelines, and all the state variables of GDN would change accordingly. The feasibility-check sub-problem aims to test whether the operation strategy and frequency regulation behavior of GT and P2G units would cause the node pressure of GDN to exceed the limit under extreme disturbance conditions, which in turn constraining the FFR procurement and the solution of the main problem operation strategy. Specifically, the feasibility-check sub-problem obtains the operation strategy derived from the main problem, and solves for the worst scenarios that could cause the node pressure of GDN to exceed the limit. The extreme scenarios are then added to the main problem with the corresponding constraints, thus ensuring that the new operating strategy solved by the main problem would not cause the node pressure of the GDN to exceed the limit even under these extreme scenarios.

V. Case Study

Figure 6:
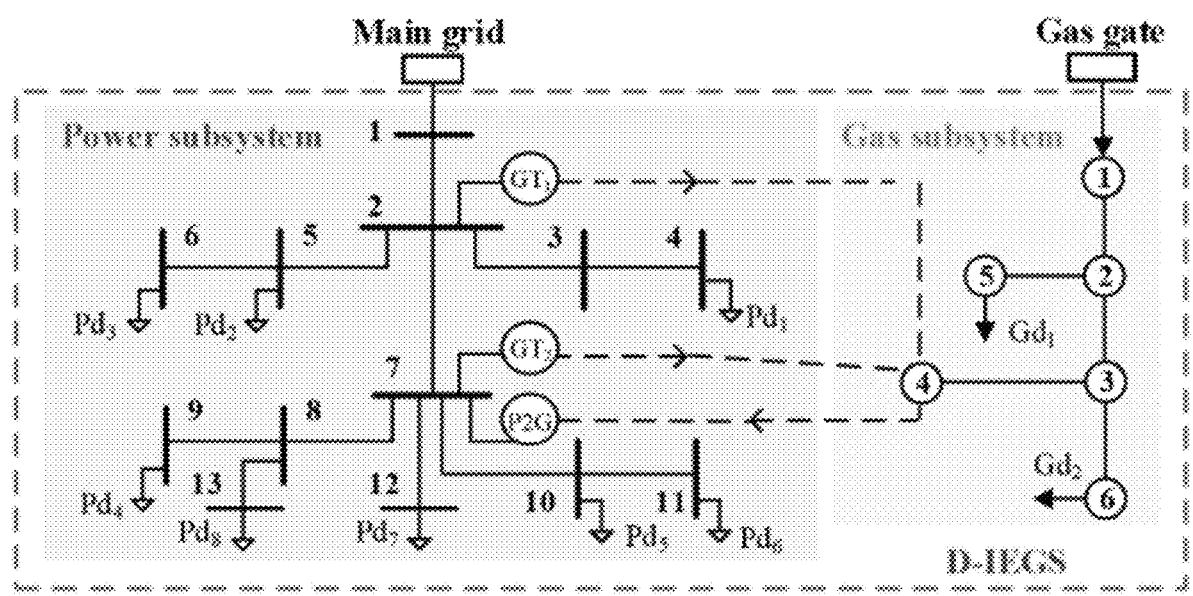
FIG. 6 shows exemplary topology of a test system according to an exemplary embodiment.

FIG. 6 shows exemplary topology of a test system according to an exemplary embodiment. In this section, the D-IEGS consisting of a 13-bus power system and a 6-node gas system is established to demonstrate the effectiveness of the described model, whose topology is shown in FIG. 6. The test system has two GTs and a P2G, and their parameters are listed in Table I. The transmission capacity of the connecting line between the D-IEGS and the main grid is 0.7 MW. The aggregated generator in the main grid is parameterized as H=6.82 s, D=1, $K^a$=25.24, $T_R^a$=7, $F_H^a$=0.3, and its generation capacity is 200 MW. The response time, duration time, and the reture time of the FFR service are set as $t_1$=20 s, $t_2$=12 minutes and $t_3$=2 minutes, respectively. The temporal resolution parameters of the proposed model are chosen as $t_e$=15 minutes, $\tau_g$=5 s, $\tau_e^f$=0.05 s and $\tau_e^s$=0.1 s. The dead band for FFR is $f_{db}$=0.033 Hz. The total duration of the D-IEGS energy management strategy is 180 minutes.

TABLE I

Parameters of the frequency regulation units.

| Generator | Capacity (MW) | Droop coefficient | Time constant (s) |
|---|---|---|---|
| $GT_1$ | 0.1 | 100 | 0.05 |
| $GT_2$ | 0.2 | 120 | 0.05 |
| P2G | 0.1 | 100 | 0.05 |

A. Effectiveness of the Proposed I-SFR Model

In addition to the described I-SFR model, three analytical models describing the post-disturbance frequency dynamics of the main grid are reproduced for comparison, which include:

SFR: Neither the deadband nor the limit of the governor is considered.

I-SFR-N-LT: Remove the governor deadband part from the proposed I-SFR model.

I-SFR-N-DB: Remove the governor limiter part from the proposed I-SFR model.

To be the qualified companion of the energy management model of the D-IEGS, which is a time-domain discretized optimization model, all of those models need to be discretized, where the time step is chosen as 0.02 s. The S-domain version of the proposed I-SFR model is regarded as the accurate model, which is established by Simulink, and its simulation time step is 0.001 s. The modeling accuracy indicators as well as the solution time of the four SFR based models are listed in Table II.

TABLE II

Model Accuracy and solution time of the four SFR based models

| Model | Accuracy Indicators (%) | | | | Solution time (s) |
|---|---|---|---|---|---|
| | $E_1$ | $E_2$ | $E_3$ | $E_4$ | |
| SFR | 40.36 | 43.46 | 14.46 | 29.87 | 0.098 |
| I-SFR-N-LT | 31.00 | 29.68 | 12.67 | 30.85 | 117.7 |
| I-SFR-N-DB | 7.19 | 11.27 | 1.15 | 2.48 | 0.256 |
| I-SFR | 0.36 | 0.24 | 0.001 | 0 | 449.6**/202.7* |

**and *represent the traditional Big-M linearization and the proposed method in Section III.C, respectively.

1) Modeling Accuracy: In Table II, four relative error indicators are proposed to compare the modeling accuracy of those models, denoted as $E_1$, $E_2$, $E_3$ and $E_4$, who targeted for the frequency nadir, the post-disturbance frequency dynamics curve, the accumulated incremental active power of the aggregated generator, and the accumulated incremental active power of the frequency regulation units in the D-IEGS, respectively. It can be observed that the proposed I-SFR model has the best performance in all four error indicators among all the models. The SFR model, however, offers the least accurate solution. The reason is that it neglects both the deadband and the limiter parts of the governor model, yielding over-optimistic solutions. The performances of the I-SFR-N-LT and the I-SFR-N-DB are better than the SFR model, as they have established more accurate governor models than the SFR. Meanwhile, the governor limiter would have larger impacts than the deadband on the modeling accuracy, especially for large disturbance cases.

2) Modeling Burden: In the SFR model, the gain of the governor w.r.t. the frequency deviation is linear. Therefore, the modeling burden of the time-domain discretized SFR model would be light, which merely consists of a set of linear equations. Though the governor model in the I-SFR-N-DB is nonlinear, due to the existence of the limiter part, it can still be equivalently converted into a linear model with additional auxiliary constraints, as shown in Section III.A. Thus, its solution time is slightly higher than the SFR. On account of the binary variables in the I-SFR-N-LT model, which are introduced to linearize the deadband part of the governor, its modeling burden would be significantly higher than the aforementioned two models. As for the described I-SFR model, one can adopt the Big-M method to linearize both the limiter and the deadband equations, which is easy to implement yet computation-expensive. Thanks to the describe linearization method in Section III.A, the number of the auxiliary binary variables in the I-SFR model could decrease from $4\mathcal{T}_6\Gamma_e$ to $2\mathcal{T}_e\Gamma_e$, leading to more than 50% solution time reduction, as shown in Table II.

3) Impacts of the Variable-Step Difference Scheme: In addition to the described variable-step difference scheme, where the time steps for the SDS and the FDS are 0.1 s and 0.02 s, respectively, two other fixed step schemes are tested for comparison, and the corresponding I-SFR models are denoted as I-SFR-s and I-SFR-f.

I-SFR-s: neglect the time constant of the FFR units, and set the difference time step as 0.1 s for all the differential equations.

I-SFR-f: consider the time constant of the FFR units, and set the difference time step as 0.02 s for all the differential equations.

TABLE III

Performances of the difference schemes

| Method | Accuracy Indicators (%) E$_1$ | E$_4$ | Solution time (s) |
|---|---|---|---|
| I-SFR-s | 2.10/0.92/0.52 | 0.67/0.23/0.24 | 2.87 |
| I-SFR-f | 0.36/0.27/0.31 | 0.4/0.1/0.08 | 202.7 |
| proposed method | 1.22/0.56/0.37 | 0.13/0.05/0.05 | 34.73 |

*/*/* represent the relative error when the D-IEGS capacity accounts for 2%/9%/20% of the total system capacity, respectively.

Table III gathers the performances of the three difference schemes. I-SFR-s has the smallest computation burden, as its difference time step is the largest. Accordingly, its modeling accuracy is the lowest. I-SFR-f has the highest modeling accuracy, while its computation time is the longest. It can be observed that the proposed variable-step difference scheme could balance the modeling accuracy and the solution burden. Furthermore, its performance could be adjusted by changing the difference time steps.

B. Energy Management Strategy Analysis of the D-IEGS

To demonstrate the benefits of the described energy management strategy to the D-IEGS and the main grid, two cases are established for comparison, which are: case-I (the procured frequency regulation reserve is set as 12% of the load demands in each time period) and case-II (the described the model, and the operation feasibility check procedure for the D-IEGS is removed).

Figure 7:
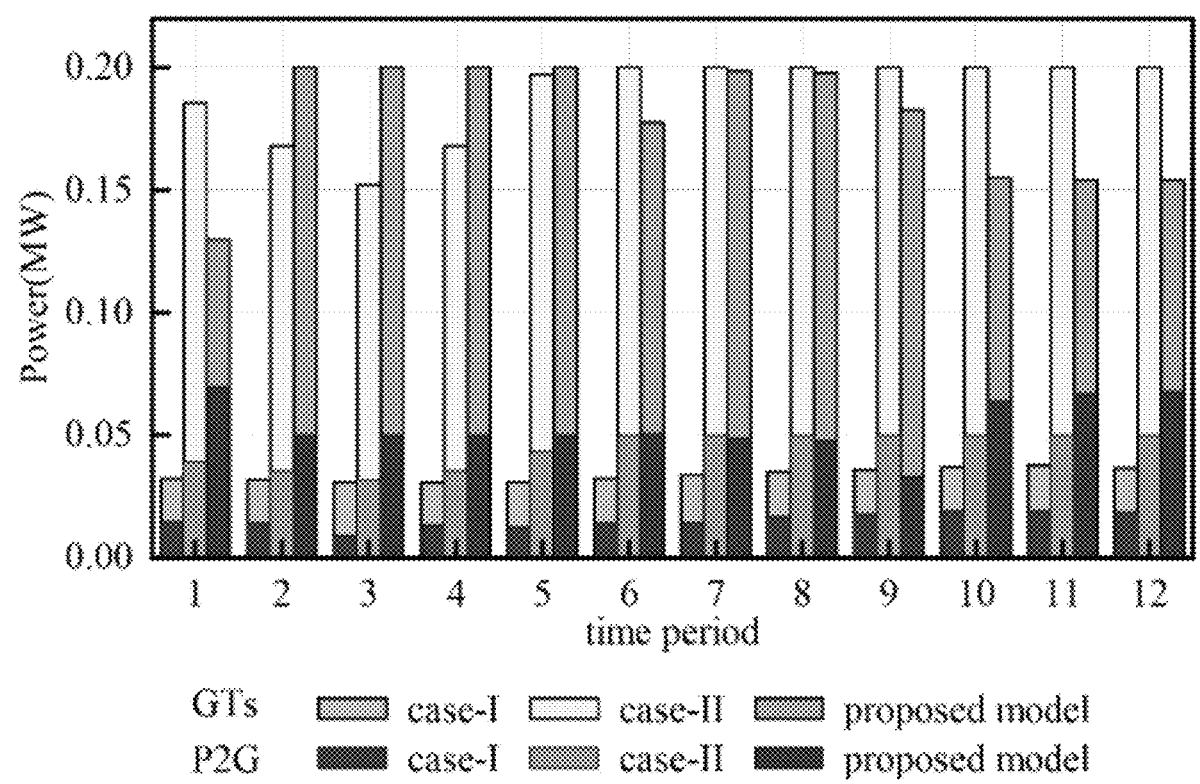
FIG. 7 demonstrates the procured frequency regulation reserve from the D-IEGS under different schemes.

1) Benefits to the D-IEGS: FIG. 7 demonstrates the procured frequency regulation reserve from the D-IEGS under different schemes. In FIG. 7, the downward and upward reserves are considered to be equal. From FIG. 7, it can be observed that the procured reserve from the D-IEGS in case-II and the described model is much larger than case-I, which demonstrates the fast-response feature of the frequency regulation units. The operation costs of the D-IEGS under different energy management schemes are summarized in Table IV. It can be learnt from the fourth column of Table IV that the procured reserve in case-II is even larger than the described model, indicating the operation constraints of the GDN may be violated in case-II. Specifically, in case-I, the self-owned GTs are barely used, and the P2G unit would keep generating gas and sell it to the upper-level gas system, due to the energy price gaps, which lead to the negative value of gas purchase costs. If the D-IEGS cannot participate in frequency regulation in a liberalized manner, i.e. case-I, most of the electrical demands in the D-IEGS would be supplied by the main grid, considering the relatively high costs of self-owned GTs, which would result in the highest electricity purchase costs among the three cases. However, if the D-IEGS could offer the FFR service in a flexible way, such as the mechanism in the proposed model, the D-IEGS would commit more self-owned GTs to supply its electrical demands, and the relatively high generation costs would be partially offset by the frequency regulation revenue. In this way, the total costs of the described model is 11.4% lower than case-I. Though the total costs of case-II is the lowest, the excessive procured FFR would jeopardize the operating condition of the GDN, say the pressure of some nodes may be lower than their lower limits.

TABLE IV

D-IEGS operation costs under different energy management schemes

| Model | Electricity purchase costs ($) | Gas purchase costs ($) | Frequency regulation revenue ($) | Total costs ($) |
|---|---|---|---|---|
| Case-I | 8429 | −556 | −552 | 7321 |
| Case-II | 6832 | 2076 | −2830 | 6078 |
| Proposed | 6548 | 2583 | −2647 | 6483 |

Figure 8:
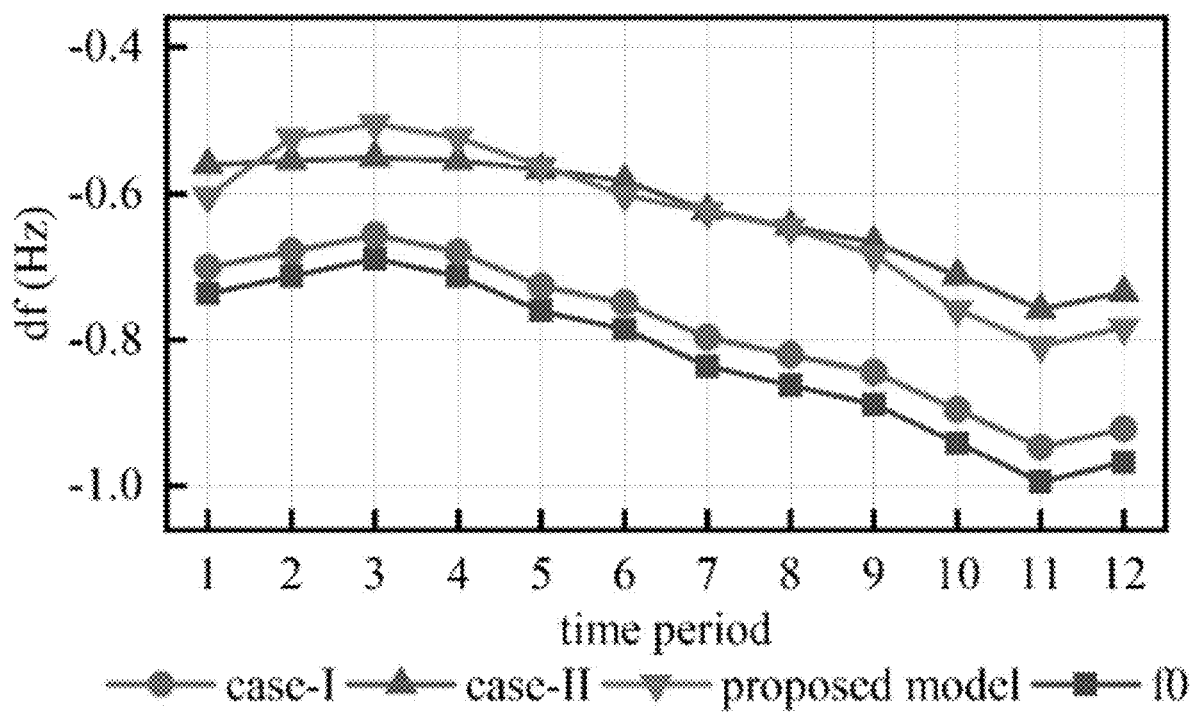
FIG. 8 shows the largest frequency deviation against the extreme low-frequency disturbance in each period according to an exemplary embodiment.

2) Benefits to the Main Grid: FIG. 8 shows the largest frequency deviation against the extreme low-frequency disturbance in each period according to an exemplary embodiment. The FFR offered by the D-IEGS could improve the post-disturbance frequency nadir. The largest frequency deviation against the extreme low-frequency disturbance in each period under the three cases are shown in FIG. 8, where the largest frequency deviation without the FFR from the D-IEGS is also presented for comparison. It can be observed that all the three cases could indeed improve the frequency nadir, and case-I is the least effective, as the procured FFR is fewest. Meanwhile, the performance of case-II and the proposed model is almost equally matched, say the proposed model outperforms case-II during periods 2 to 4 yet case-II is better during periods 9 to 12. Moreover, the performance of case-II is more stable than the described model, whose largest frequency deviation curve is flatter. However, the operation constraints of the GDN is neglected in case-II, which would lead to over-optimistic results. The detailed analysis would be presented in Section IV.C.

C. Gas-Electricity Interdependency Analysis of the D-IEGS

Figure 9:
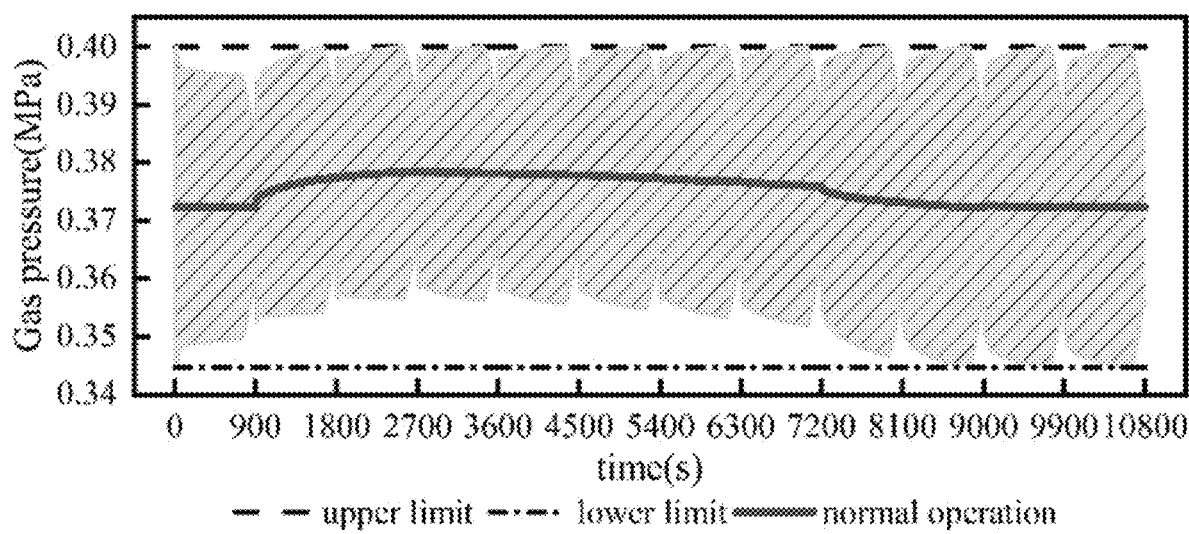
FIG. 9 shows the pressure variation range of node 4 considering FFR.
Figure 10:
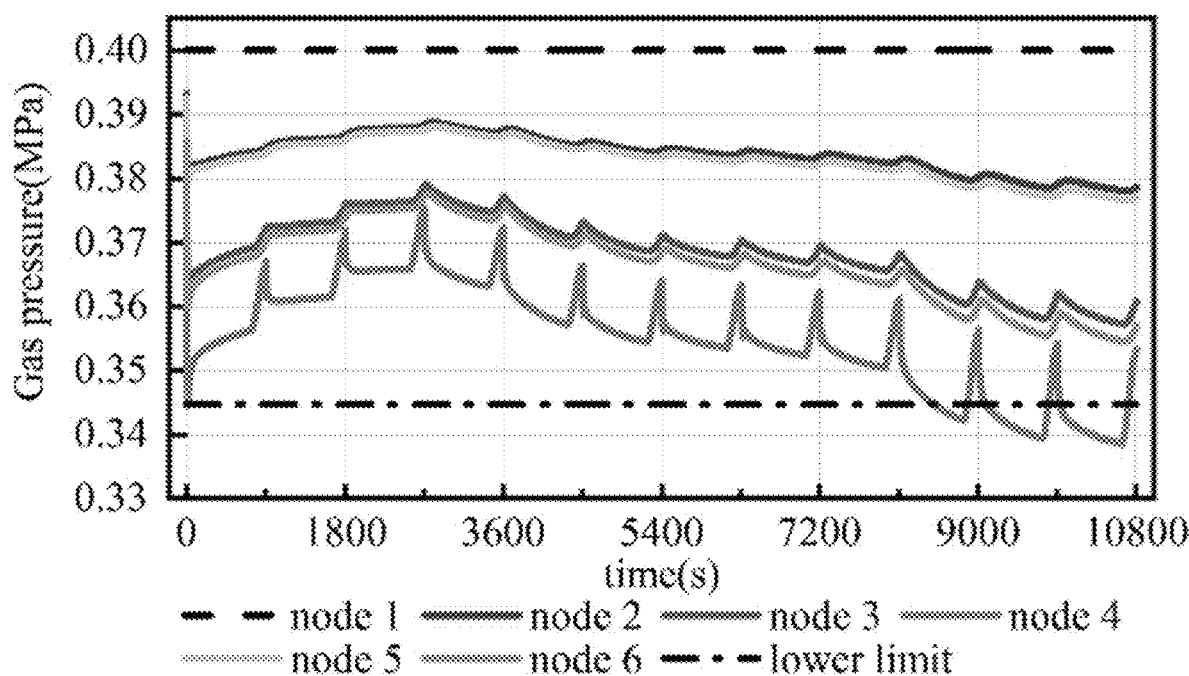
FIG. 10 shows node pressure curves in extreme low-frequency disturbance under the scheme of case-II according to an exemplary embodiment.

1) Necessity of Considering GDN Operation Constraints: In the D-IEGS, the interdependency between the GDN and the PDN is enabled by the self-owned GTs and the P2G units, where the bi-directional energy conversion occurs in both the pre- and post-disturbance stages. Once the node gas injection changes, it would be broadcast to the whole network via gas pipelines, and all the state variables, including the node pressure and flow density, of the GDN would change accordingly. FIG. 9 shows the pressure variation range of node 4 considering FFR. The blue bold curve describes the pressure dynamics of node 4 under the normal operation condition, namely the FFR is not activated, which is quite stable, although it is connected to all the three frequency regulation units in the PDN. The reason is that the GTs and P2G units would prefer preserving sufficient upward and downward regulation capacities to provide the FFR service in the post-disturbance stage, which indicates their base-case outputs would be stable. If the low/high-frequency disturbance occurs, the outputs of the frequency regulation units would change to mitigate the frequency deviation, and the node pressure of the GDN would change accordingly. The shadow area in FIG. 9 is the envelope of pressure of node 4 considering FFR. As the pressure limits and flow dynamics constraints of the GDN are considered in the proposed model, the node pressure would not go beyond the limit even under extreme disturbance conditions. FIG. 10 shows node pressure curves in extreme low-frequency disturbance under the scheme of case-II according to an exemplary embodiment. It can be observed that the pressure of node 4 would be lower than its lower limit during 8000 to 10800 seconds. At that time, the procured FFR cannot be fully utilized due to the pressure violation in the GDN, indicating the necessity of considering GDN operation constraints while committing FFR.

Figure 11:
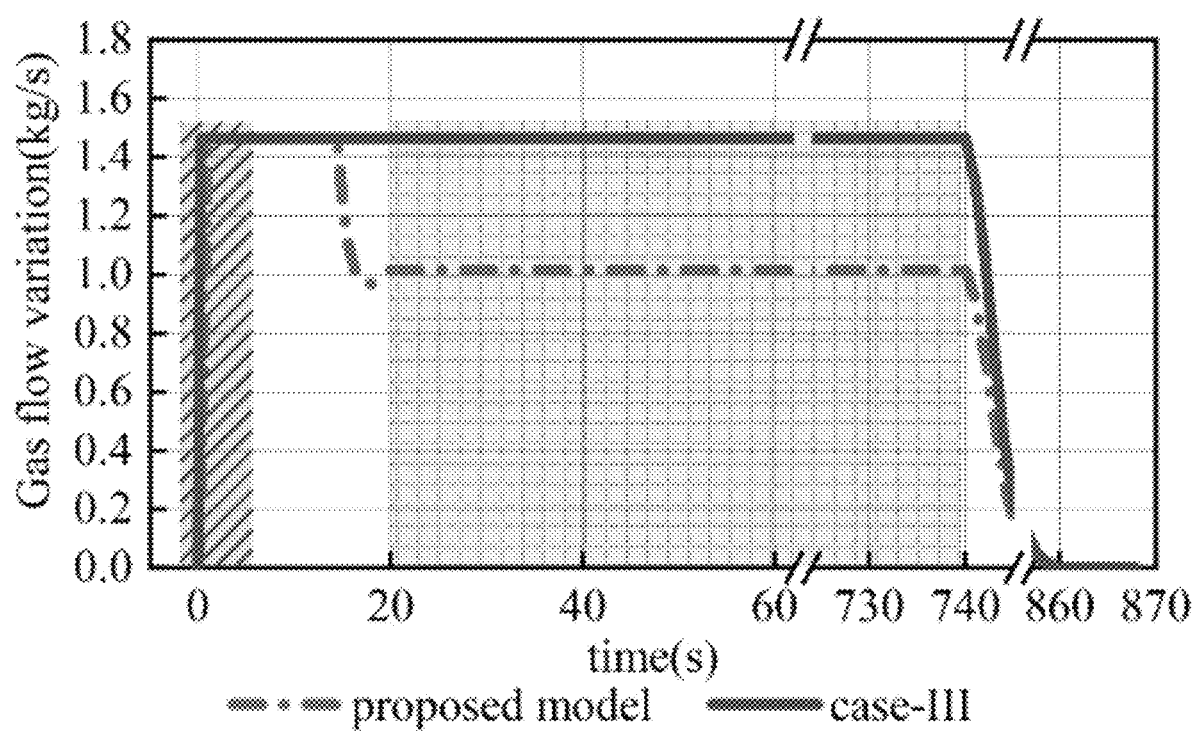
FIG. 11 shows an exemplary gas flow variation curve during the FFR utilization process according to an exemplary embodiment.

2) Necessity of Detailed Behavior Modeling of FFR Units: FIG. 11 shows an exemplary gas flow variation curve during the FFR utilization process according to an exemplary embodiment. Based on (2), the incremental outputs of the FFR units during the frequency disturbance could be quantified. Further, the corresponding gas flow variation could be calculated by (6e). In fact, one can get an approximation of the gas flow variation caused by the utilization of the FFR, denoted as case-III hereinafter, as shown in FIG. 11, where the gas flow variation curve calculated by the described method is also listed for comparison. In case-III, the consumed gas would have a step change once the FFR is activated, and keep constant during the FFR duration period, where the incremental value is the committed FFR divided by the energy conversion efficiency, namely $R_{gt_e}/\eta_g$. In the described model, however, the gas consumption/production variation is driven by the post-disturbance frequency dynamics of the main grid. Therefore, the gas flow variation curve under the two methods are significantly different during two stages, i.e., the frequency drop/jump stage (right after the disturbance, usually lasts for 10 to 30 seconds) and the stable-output stage (from the time of frequency nadir to the end of FFR duration period), which are marked in FIG. 11.

Figure 12:
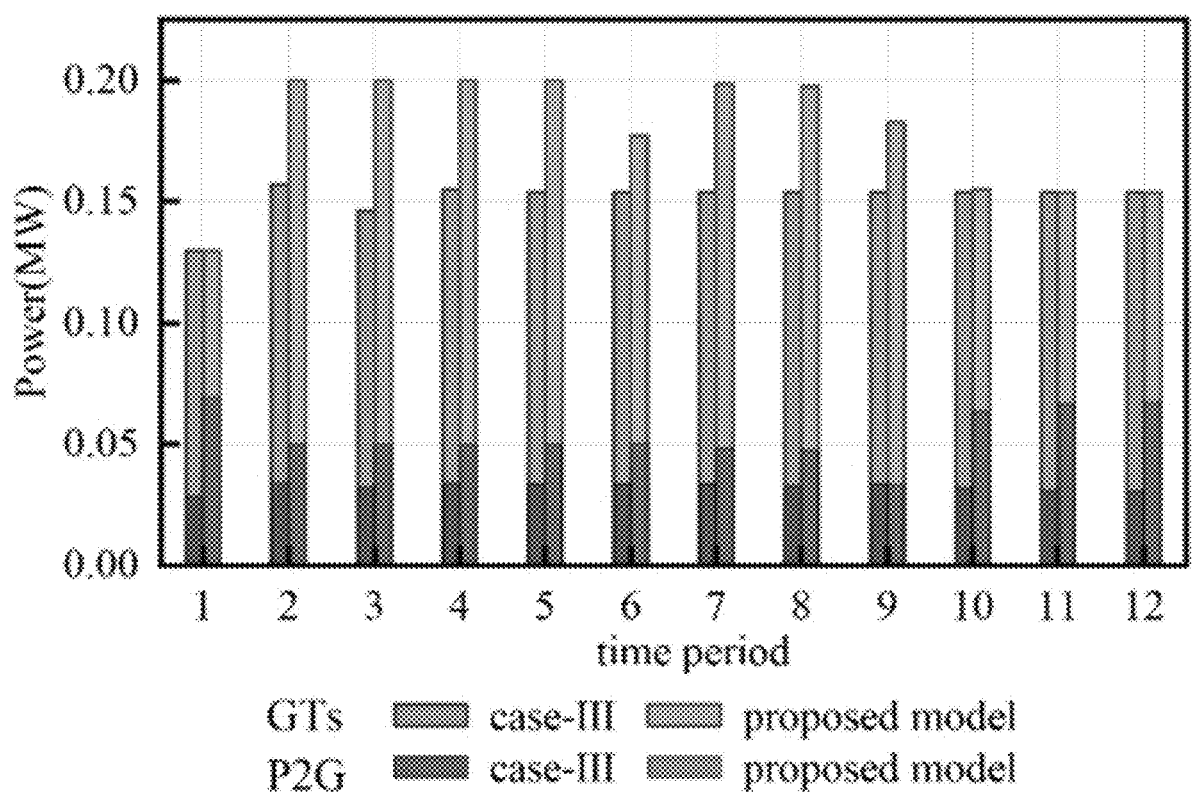
FIG. 12 shows exemplary procured FFR in case-III and the described model according to an exemplary embodiment.

FIG. 12 shows exemplary procured FFR in case-III and the described model according to an exemplary embodiment. Intuitively, the integration of gas flow variation in case-III would be larger than the described model, which means the impacts of the FFR on the GDN operation would be exaggerated in case-III. Therefore, the committed FFR in case-III would be lower than the proposed model, as shown in FIG. 12, where the FFR in case-III is significantly lower than the proposed model during period 2 to period 9. Such conservative FFR procurement strategy would also lead to the increment of the D-IEGS operation costs. For example, the total operation costs in case-III is 6928\$, which is 6.86% higher than the proposed model, demonstrating the necessity of the detailed behavior modeling of FFR units.

VI. Conclusion

In this disclosure, the energy management problem of the D-IEGS with FFR is analyzed, so as to enhance the frequency stability of the main grid. The post-disturbance frequency response behaviors of both the main grid and the D-IEGS are precisely depicted, where the dead zones, limiting ranges and time constant of the governors are considered. The frequency regulation units of the D-IEGS include GTs and P2G units, whose impacts of providing frequency regulation service on the gas networks are quantified. Considering the time-scale similarity of the frequency dynamics and the dynamics of the GDN, the gas flow dynamics model is adopted. To ease the computation burden brought by modeling the heterogeneous dynamics systems, i.e., the frequency dynamics of the main grid, the frequency response dynamics of the GTs and P2G units, and the gas flow dynamics of the GDN, a variable-step difference scheme and a binary variable reduction method are devised. Simulation results demonstrate both the D-IEGS and the main grid could benefit from the FFR mechanism as long as the FFR price signal is properly tuned. In addition, the frequency regulation behaviors of GTs and P2G units could jeopardise the node pressure of the GDN. Therefore, they need to be accurately modeled along with the GDN dynamics, in order to maximize the FFR offering capability of the D-IEGS.

Technical Implementation of the Exemplary System

Figure 13:
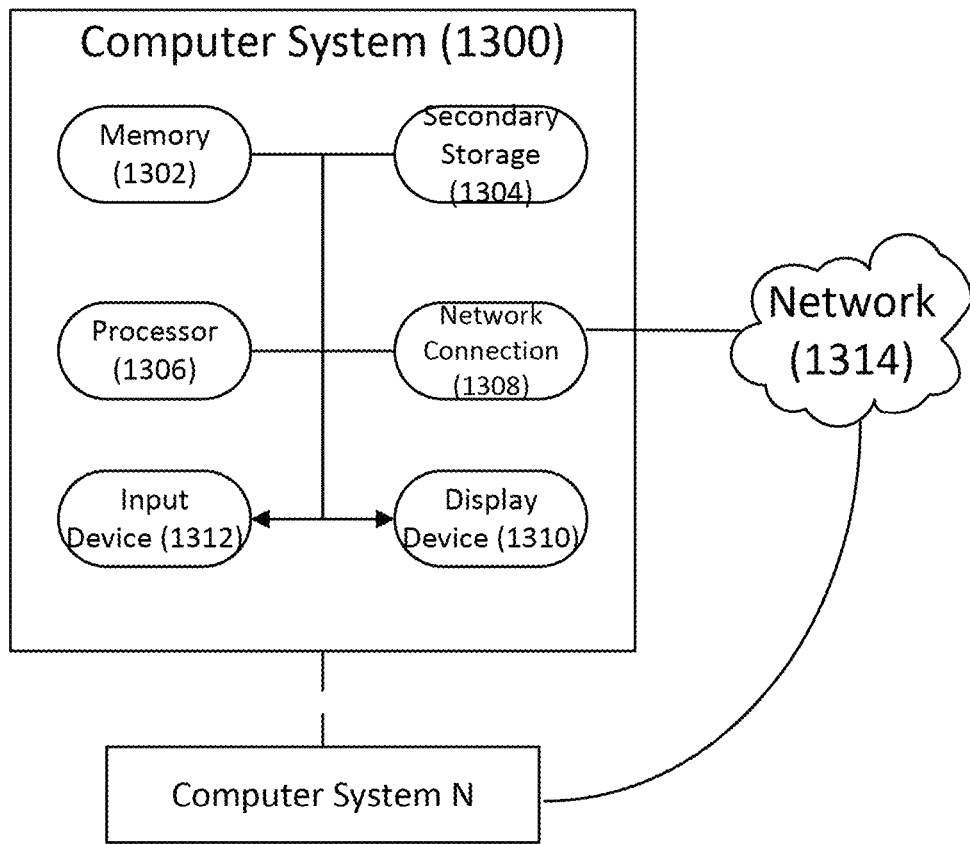
FIG. 13 illustrates exemplary hardware components for a system according to an example embodiment of the present disclosure.

FIG. 13 illustrates exemplary hardware components of an exemplary system. A computer system 1300, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 1300, may run an application (or software) and perform the steps and functionalities described above. Computer system 1300 may connect to a network 1314, e.g., Internet, or other network, to receive inquiries, obtain data, and transmit information and incentives as described above.

The computer system 1300 typically includes a memory 1302, a secondary storage device 1304, and a processor 1306. The computer system 1300 may also include a plurality of processors 1306 and be configured as a plurality of, e.g., bladed servers, or other known server configurations. The computer system 1300 may also include a network connection device 1308, a display device 1310, and an input device 1312.

The memory 1302 may include RAM or similar types of memory, and it may store one or more applications for execution by processor 1306. Secondary storage device 1304 may include a hard disk drive, floppy disk drive, CD-ROM drive, or other types of non-volatile data storage. Processor 1306 executes the application(s), such as those described herein, which are stored in memory 1302 or secondary storage 1304, or received from the Internet or other network 1314. The processing by processor 1306 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 1300 may store one or more database structures in the secondary storage 1304, for example, for storing and maintaining the information necessary to perform the above-described functions. Alternatively, such information may be in storage devices separate from these components.

Also, as noted, processor 1306 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 1300.

The input device 1312 may include any device for entering information into the computer system 1300, such as a touch-screen, keyboard, mouse, cursor-control device, microphone, digital camera, video recorder or camcorder. The input and output device 1312 may be used to enter information into GUIs during performance of the methods described above. The display device 1310 may include any type of device for presenting visual information such as, for example, a computer monitor or flat-screen display (or mobile device screen). The display device 1310 may display the GUIs and/or output from sub-system components (or software).

Examples of the computer system 1300 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1300 is shown in detail, system 1300 may use multiple computer systems or servers as necessary or desired to support the users and may also use back-up or redundant servers to prevent network downtime in the event of a failure of a particular server. In addition, although computer system 1300 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1300, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

What is claimed is:

1. A method for managing a fast frequency response (FFR) of a distribution-level integrated electric-gas system (D-IEGS), the method comprising:

operating a D-IEGS wherein:

an active power disturbance uncertainty is modeled as:

$$\Delta P_{dis,t_e} = z_{t_e}^u \Delta P_{dis,t_e}^- - z_{t_e}^d \Delta P_{dis,t_e}^+, \forall t_e$$

$$\{z_{t_e}^u, z_{t_e}^d \in \{0,1\}, z_{t_e}^u + z_{t_e}^d \leq 1\}, \quad (11)$$

wherein $t_e$ represents a scheduling period of a power system; $\Delta P_{dis,t_e}$ is an aggregated active power disturbance; $\Delta P_{dis,t_e}^-$ is a negative active power disturbance; $\Delta P_{dist,t_e}^+$ is a positive active power disturbance; and $z_{t_e}^u$ and $z_{t_e}^d$ are binary variables, and represent a disturbance type, FFR incremental outputs can be described by:

$$\tilde{P}_{gt_e,k} = P_{gt_e} + (z_{gt_e}^u - z_{gt_e}^d) \Delta P_{t_e,k}^g, \quad 1 \leq k \leq N$$

$$\{z_{gt_e}^u, z_{gt_e}^d \in \{0,1\}, z_{gt_e}^u + z_{gt_e}^d \leq 1\} \quad (12)$$

$$\tilde{P}_{pt_e,k} = P_{pt_e} - (z_{pt_e}^u - z_{pt_e}^d) \Delta P_{t_e,k}^p, \quad 1 \leq k \leq N$$

$$\{z_{pt_e}^u, z_{pt_e}^d \in \{0,1\}, z_{pt_e}^u + z_{pt_e}^d \leq 1\} \quad (13)$$

wherein $\Delta P_{t_e,k}^g$ and $\Delta P_{t_e,k}^p$ denote the incremental active power outputs/consumption of gas-fired turbines (GTs) and power-to-gas (P2G) units during an FFR regulation process; k is an index for frequency dynamics difference time step and N is a total number of time steps; $z_{gt_e}^u$ and $z_{gt_e}^d$ are binary variables, representing an uncertainty of GT active power outputs; $z_{pt_e}^u$ and $z_{pt_e}^d$ are binary variables, representing an uncertainty of P2G active power consumption; $P_{gt_e}$ is a steady-state active power outputs of GT; $P_{pt_e}$ is a steady-state active power consumption of P2G; and $\tilde{P}_{gt_e,k}$ and $\tilde{P}_{pt_e,k}$ are an uncertain active power outputs of GT and an uncertain active power consumption of P2G, respectively, and a gas load uncertainty can be quantified by:

$$\tilde{M}_{gt_g} = \begin{cases} \tilde{P}_{gt_e,k}/\eta_g, \tau \in [1, N] \\ P_{gt_e}/\eta_g, \tau \in (N, N_g] \end{cases}, \tilde{M}_{pt_g} = \begin{cases} \tilde{P}_{pt_e,k}\eta_p, \tau \in [1, N] \\ P_{pt_e}\eta_p, \tau \in (N, N_g] \end{cases} \quad (14)$$

wherein $\tilde{M}_{gt_g}$ and $\tilde{M}_{pt_g}$ represent a gas consumption uncertainty of the GTs and a gas generation uncertainty of the P2G units; $\tilde{P}_{gt_e,k}$, $\tilde{P}_{pt_e,k}$, $P_{gt_e}$, $P_{pt_e}$, and N are as defined in the formulas (12) and (13); $\eta_g$ is an energy conversion efficiency of GT; $\eta_p$ is an energy conversion efficiency of P2G; $\tau$ is a time resolution of a gas flow model; and $N_g$ is a number of gas flow time difference steps in one power system scheduling period;

initializing an energy management main problem of the D-IEGS as follows:

$$\min_{x} c^T x + b^T \tilde{y} \qquad (15)$$

s.t. $Ax + B\tilde{y} \le d$ $\|F_i x + g_i\|_2 \le K_i^T x + f_i, i \in \mathcal{L}$ wherein $\tilde{y}$ denotes an FFR reserve vector; x is a vector of all the remaining decision variables; A, B, $F_i$, $K_i$, d, $g_i$, $f_i$, c and b are constant coefficient matrices or vectors; i and $\mathcal{L}$ are an index and a set of second-order cone (SOC) constraints;

solving a feasibility-check sub-problem to test the operation constraint violation against a worst-case uncertainty, wherein the feasibility-check sub-problem is as follows:

$$\max_{z} \min_{s \ge 0, x} 1^T s \qquad (16)$$

s.t. $Ex + Gs + Hz \le h - C\tilde{y}^*$ $\|F_i x + g_i\|_2 \le K_i^T x + f_i, i \in \mathcal{L}$ where z denotes boolean uncertainty variables; s denotes relax variables; $\tilde{y}^*$ is a solution of a master problem; x, $F_i$, $K_i$, $g_i$, $f_i$ are as defined in the formula (15); and E, G, H, h, C are constant coefficient matrices or vectors, and if an objective value of (16) is positive, it indicates the energy management strategy of the D-IEGS is not robust to all the possible frequency disturbances and the following constraints is added to the main problem:

$$Ex^j + C\tilde{y} + Hz^{j*} \le h \qquad (17)$$

$\|F_i x^j + g_i\|_2 \le K_i^T x^j + f_i, i \in \mathcal{L}$ wherein j is an iteration index; $z^{j*}$ represents an identified worst-case uncertainty in $j^{th}$ iteration; $x^j$ is a new variable vector added to the main problem; and remaining variables are as defined in the formulas (15) and (16), and solve the main problem and the feasibility-check sub-problem again; and adjusting power generation of GTs and P2G units based on the new variables to change node gas injection and gas distribution network (GDN).

* * * * *